M. E. JOHNSON.
STEAM COOKER.
APPLICATION FILED NOV. 1, 1910.
1,003,112.
Patented Sept. 12, 1911.
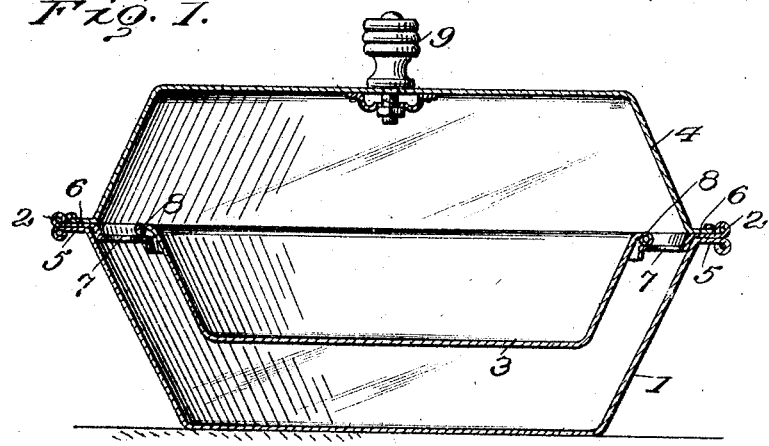
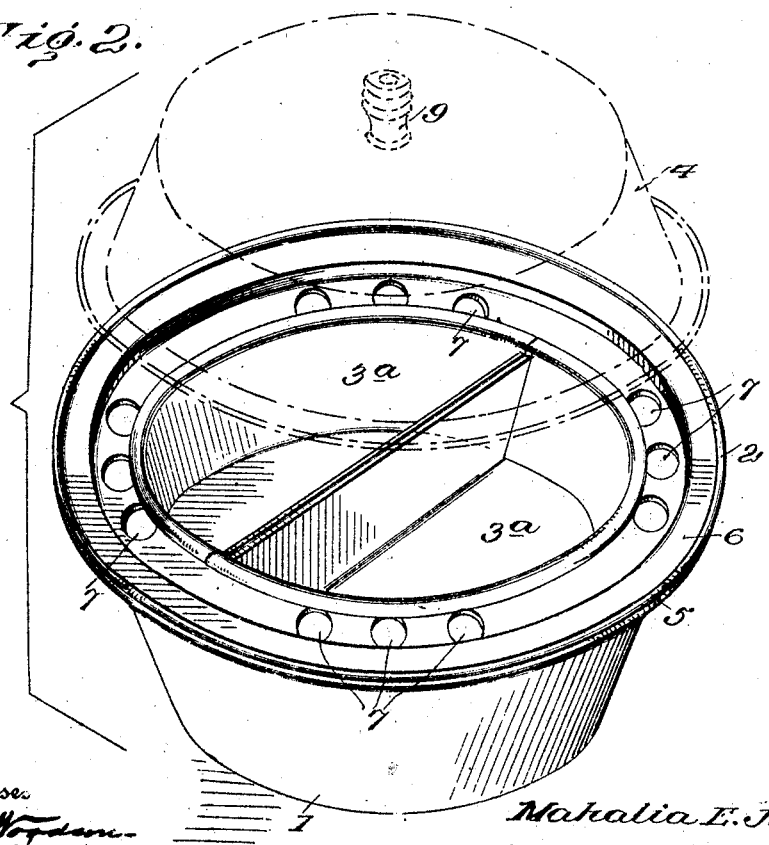

UNITED STATES PATENT OFFICE.

MAHALIA E. JOHNSON, OF RENO, NEVADA.

STEAM-COOKER.

1,003,112.

Specification of Letters Patent. Patented Sept. 12, 1911.

Application filed November 1, 1910. Serial No. 590,206.

*To all whom it may concern:*

Be it known that I, MAHALIA E. JOHNSON, citizen of the United States, residing at Reno, in the county of Washoe and State of Nevada, have invented certain new and useful Improvements in Steam-Cookers, of which the following is a specification.

This invention comprehends certain new and useful improvements in cooking devices or utensils, and the invention has for its primary object an improved construction of steamer which will prove simple and efficient in cooking cereals, vegetables such as rice, in making puddings and similar desserts, and in keeping food warm without danger of burning or drying up the same.

With this and other objects in view as will more fully appear as the description proceeds, the invention consists in certain constructions and arrangements of the parts as I will hereinafter fully describe and claim.

For a full understanding of the invention, reference is to be had to the following description and accompanying drawings in which:—

Figure 1 is a transverse sectional view of a cooking or food warming device embodying the improvements of my invention. Fig. 2 is a perspective view thereof, the lid or cover being shown in elevated relation to the rest of the device and in dotted lines, this view also showing a modified form of the food-containing pan.

Corresponding and like parts are referred to in the following description and indicated in all the views of the accompanying drawings by the same reference characters.

My improved steaming device embodies a bottom pan 1, a ring 2 adapted to fit on the pan 1, an inner pan 3, and a lid or cover 4. The bottom pan 1 is preferably formed with an outturned rim flange 5, and the ring 2 is formed with a corresponding upwardly offset and outwardly projecting flange 6 adapted to fit within the rim of the bottom pan 1 and project out over the flange 5 of the latter. In the main inner portion of the ring 2 are any desired number of perforations 7, the same permitting the steam from the water in the bottom pan 1 to pass upwardly so as to fill the space above the inner pan 3 in which the food to be cooked or warmed is placed. The lid or cover 4 is of dome shape as shown, so that provision is made for the rising of puddings or the like. The inner pan 3 is also provided with an outwardly projecting rim flange 8 which fits upon the inner main or perforated portion of the ring 2 so as to suspend the inner pan 3 from the ring within and spaced from the bottom of the bottom pan 1.

If desired, I may employ, instead of the inner pan 3, two mating pans 3ª of segmental shape as shown, whereby two different kinds of foods may be cooked or kept warm within the device.

From the foregoing description in connection with the accompanying drawing, the operation of my improved cooking utensil will be apparent.

In the practical use of the device, it is obvious that it may be used in various ways as the skill, experience and judgment of the cook will dictate, but in any instance the pan 1 contains a predetermined amount of water, while the pan 3 contains the food, either with or without the addition of water, according to the particular food to be cooked or the food to be maintained in warm condition. As the water in the pan 1 boils, the steam or vapor generated thereby will pass upwardly through the perforations 7 and cook the food or keep the same warm by the steam process, all liability of burning being absolutely precluded and it being thereby rendered unnecessary for the cook to remove the lid and glance at the food from time to time. It is also to be noted that none of the parts of the device are provided with a handle, the parts being thereby rendered more easy to clean and being easily kept sanitary. The only part which may be at all likened to a handle is the knob 9 on top of the lid or cover 4.

It will be noted that the pan 1, the inner pan 3, and the cover or lid 4 are of the shape and size of ordinary bake pans, and that the ring 2 and its supporting flange or inner portion serves to hold these pans in position when assembled. The complete cooker is therefore mainly composed of stock parts, the ring 2 admitting of the assembling of the same to produce the improved steam cooker.

What I claim is:

A steam cooker comprising a deep pan, a dome cover closing the pan, said pan and said cover having registering outturned flanges for supporting the cover, a ring interposed between the flanges and having an inwardly extending and downwardly offset supporting flange having apertures providing sources of communication between the deep pan and the cover, said ring being rolled up at its outer edge to provide a stop for the flange of the cover to hold the same in position, and a small pan fitted through the supporting flange and having an outturned bead engaging the supporting flange to hold the small pan above the bottom of the deep pan.

In testimony whereof, I affix my signature in presence of two witnesses.

MAHALIA E. JOHNSON. [L. S.]

Witnesses:
 LOUISE CHRISTENSON,
 ALBERT D. AYRES.